(12) United States Patent
Johnson et al.

(10) Patent No.: US 6,340,186 B2
(45) Date of Patent: Jan. 22, 2002

(54) INJECTION MOLDED COMPONENTS FOR OFF-ROAD RECREATIONAL AND UTILITY VEHICLES

(75) Inventors: Mitchell D. Johnson; Michael A. Klein, both of Roseau; Matthew David Parks, Orono; Mark Thomas Karl, Roseau; Patrick Johnson, Winona, all of MN (US); Tim Spahr, Galesville, WI (US); Jeff Sajna, St. Charles, IL (US); Craig Andrews, Brighton, MI (US); Kenneth Terry Higgins, Metamora, MI (US); Robert A. Lowery, Troy, MI (US); Keith D. Ruby, Hopkinsville, KY (US); Alton Mitchell, Princeton, KY (US); Rhonda L. Davis, Hopkinsville, KY (US)

(73) Assignee: Polaris Industries Inc., Minneapolis, MN (US)

( * ) Notice: Subject to any disclaimer, the term of this patent is extended or adjusted under 35 U.S.C. 154(b) by 0 days.

(21) Appl. No.: 09/491,092

(22) Filed: Jan. 24, 2000

Related U.S. Application Data

(62) Division of application No. 08/566,844, filed on Dec. 4, 1995, now Pat. No. 6,016,943, which is a continuation of application No. 08/536,754, filed on Sep. 29, 1995, now abandoned.

(51) Int. Cl.[7] .............................................. B60R 19/03
(52) U.S. Cl. ..................................... 293/120; 293/102
(58) Field of Search ................................ 293/120, 102; 180/908

(56) References Cited

U.S. PATENT DOCUMENTS

| | | | |
|---|---|---|---|
| 1,651,974 A | 12/1927 | Specht | 224/524 |
| 1,854,946 A | 4/1932 | Loring | 224/524 |
| 1,977,735 A | 10/1934 | Monckmeier | 224/524 |
| 2,536,570 A | 1/1951 | Rehn | 224/454 |
| 2,986,284 A | 5/1961 | Colbert | 211/134 |
| 4,030,648 A | 6/1977 | Johnson et al. | 224/452 |
| 4,230,245 A | 10/1980 | Pold et al. | 224/413 |
| 4,271,996 A | 6/1981 | Montgomery | 224/452 |
| 4,300,706 A | 11/1981 | Hendrick et al. | 224/412 |
| 4,480,773 A | 11/1984 | Krauser | 224/413 |
| 4,941,701 A | * 7/1990 | Loren | 293/120 X |
| 4,951,986 A | * 8/1990 | Hanafusa et al. | 296/120 |
| 5,141,273 A | * 8/1992 | Freeman | 293/120 X |
| D331,736 S | 12/1992 | Newbold | D12/407 |
| 5,269,574 A | * 12/1993 | Bhutani et al. | 293/120 X |
| D369,138 S | 4/1996 | Gotschi | |
| D378,080 S | 2/1997 | Walters et al. | |
| D389,440 S | 1/1998 | Walters et al. | |
| D400,143 S | 10/1998 | Walters et al. | |
| 5,927,778 A | * 7/1999 | Uytterhaeghe et al. | 293/120 |
| 5,967,592 A | * 10/1999 | Freeman | 293/120 |

* cited by examiner

*Primary Examiner*—Joseph D. Pape
*Assistant Examiner*—Jason Morrow
(74) *Attorney, Agent, or Firm*—Fredrikson & Byron, P.A.

(57) ABSTRACT

Injection molded bumpers for off-road recreational and utility vehicles such as ATV's, snowmobiles and the like. In one embodiment, the invention provides an injection molded bumper comprising a fiber-filled plastic resin body. Optionally, the fiber-filled plastic resin may have fibers of a length of at least about ¼ inch. The body has an overall thickness substantially less than its width and length, and includes a generally vertically oriented front surface having upper and lower peripheral edges. At least a portion of the upper peripheral edge and at least a portion of the lower peripheral edge each has a flange extending generally horizontally away from the front surface. The flanges have thicknesses substantially less than the lengths they extend from the front surface and thereby define generally horizontally extending reinforcing ribs. Additional reinforcing ribs may also be provided intermediate the flanges.

26 Claims, 14 Drawing Sheets

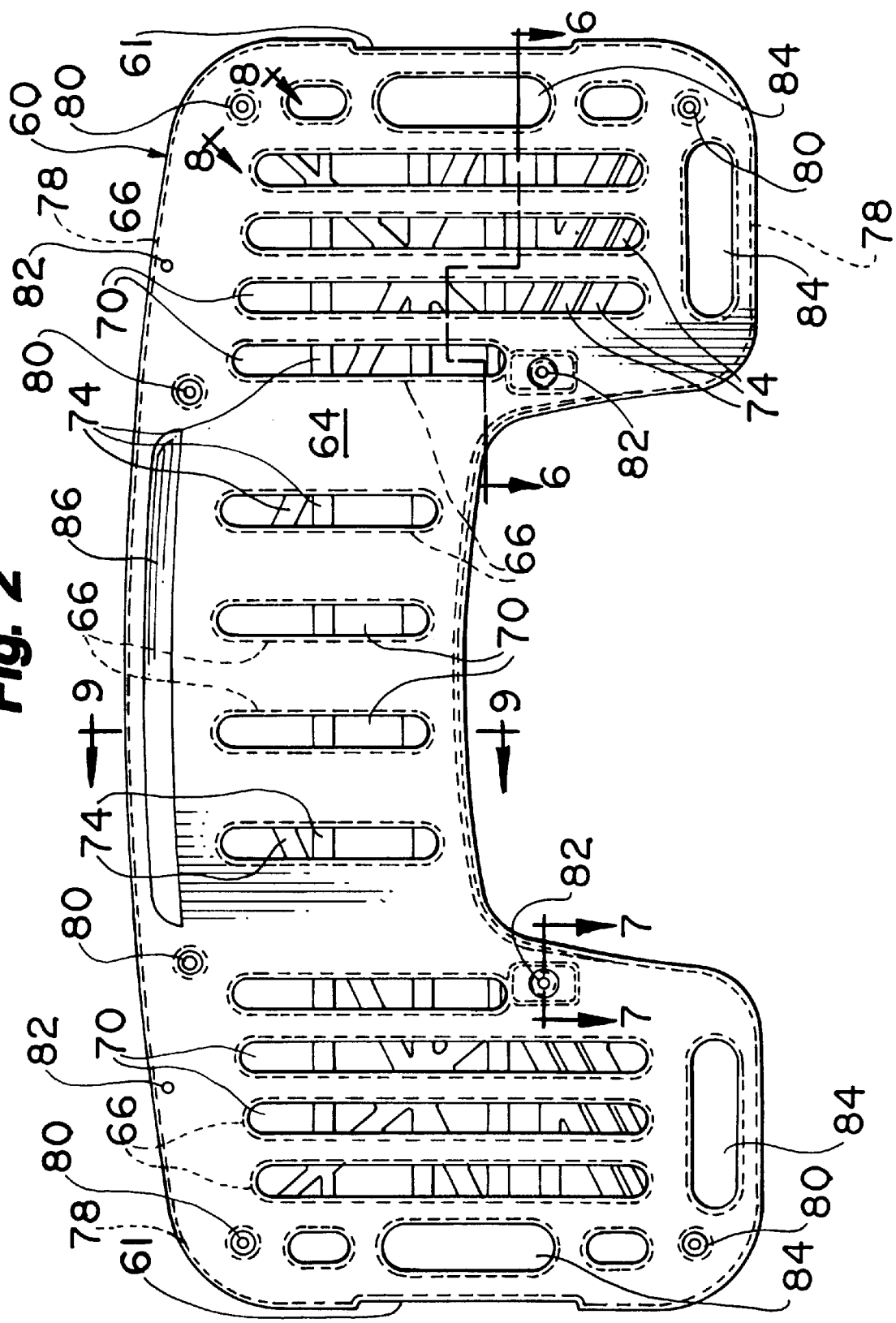

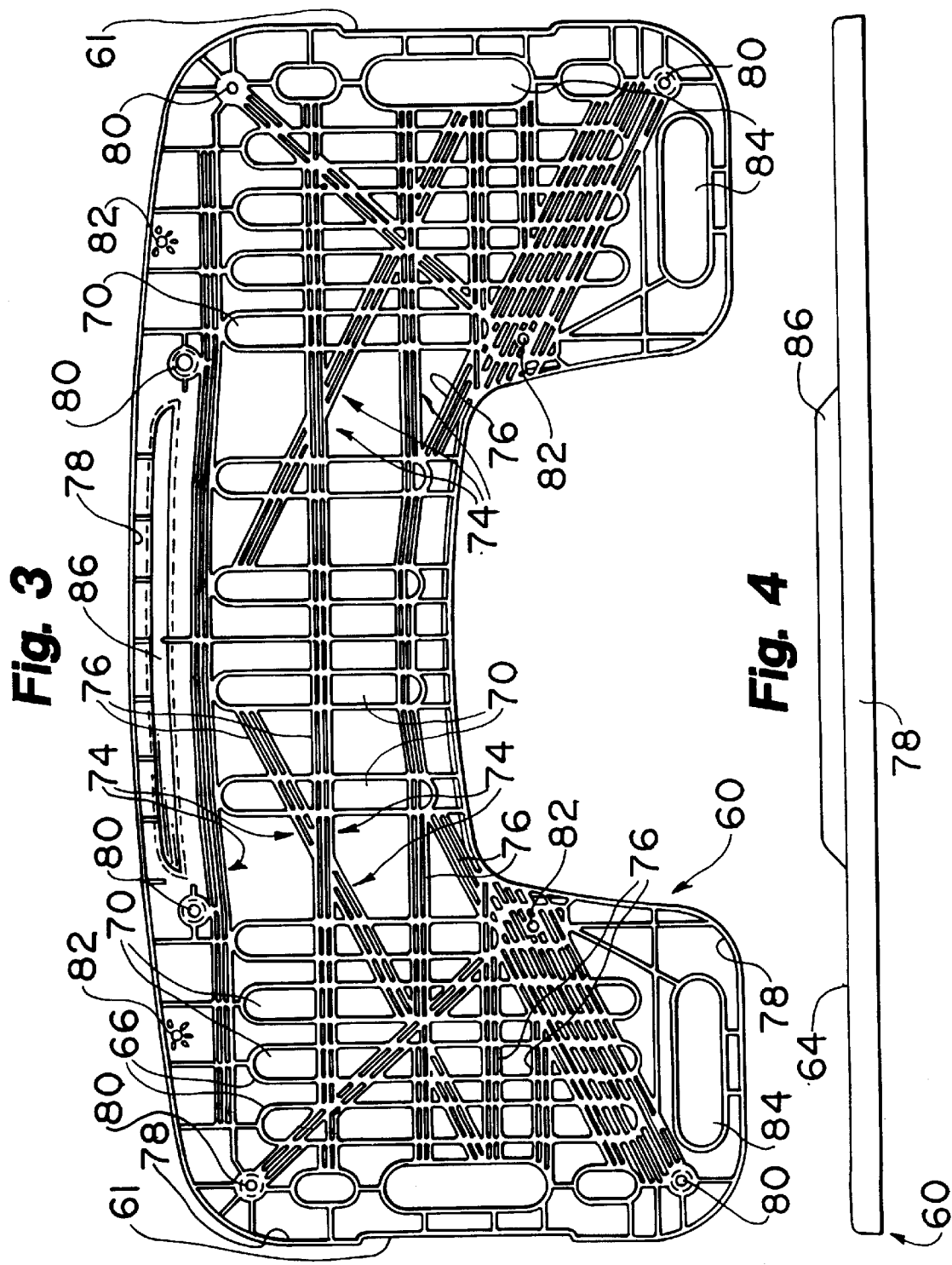

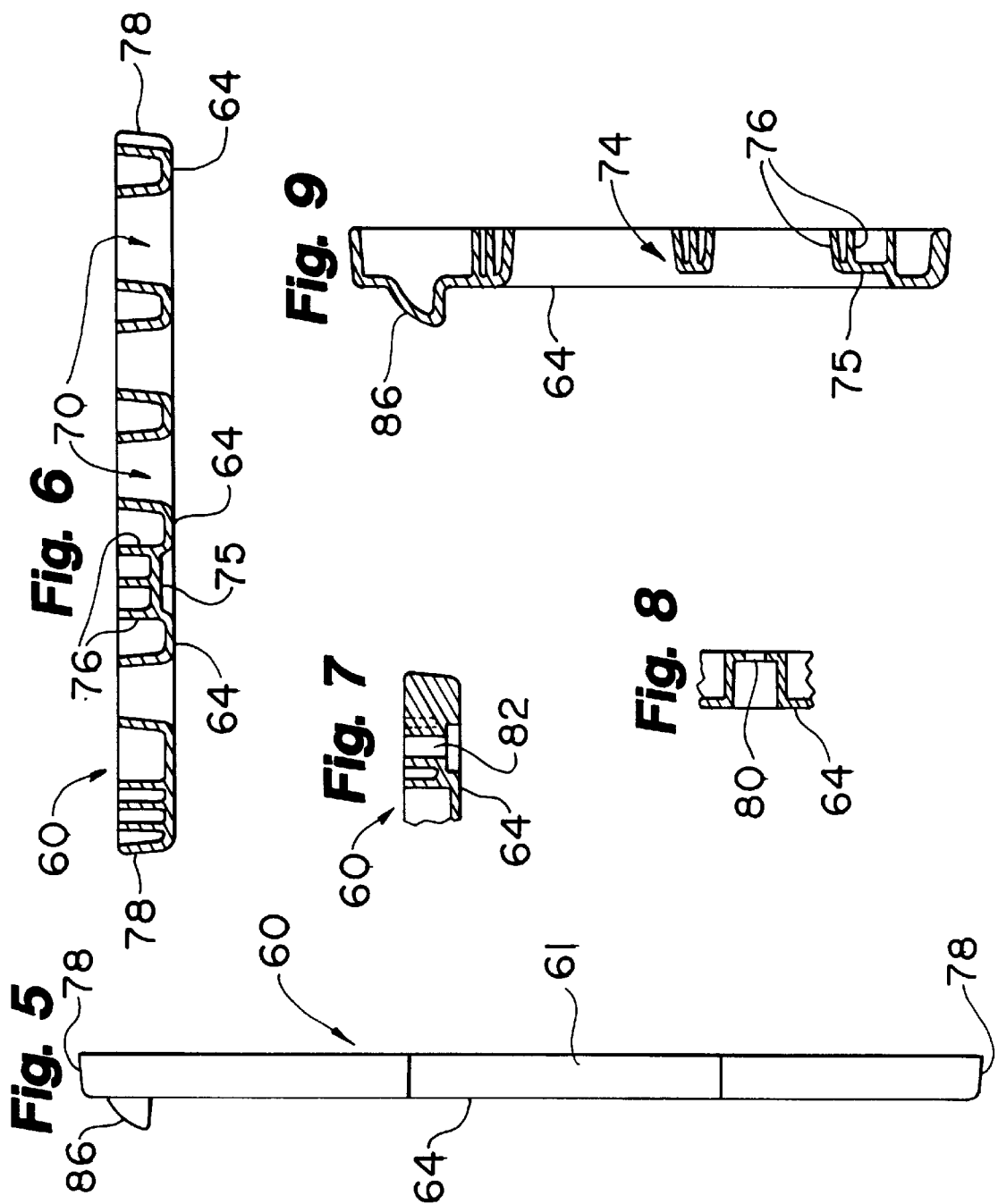

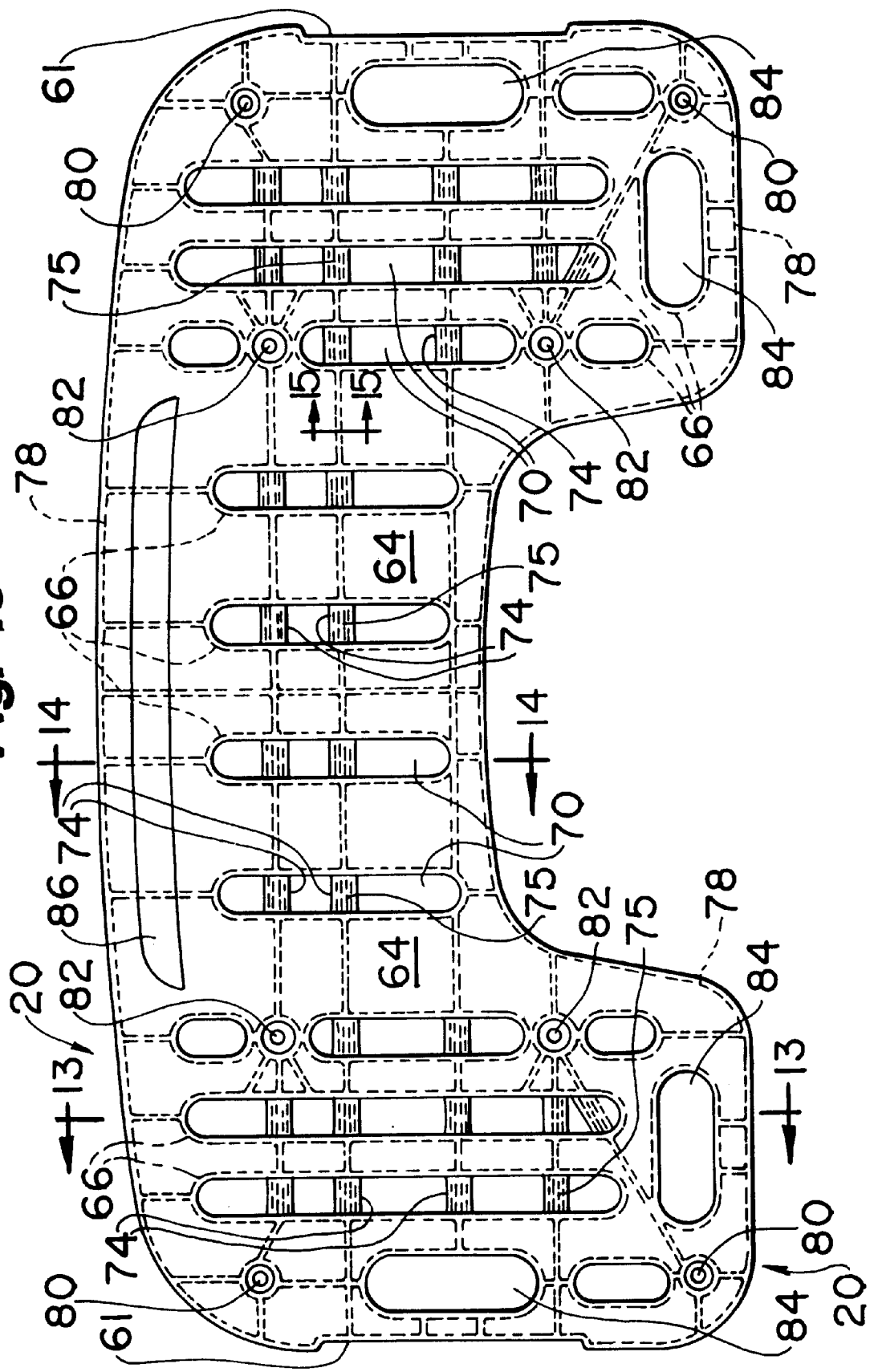

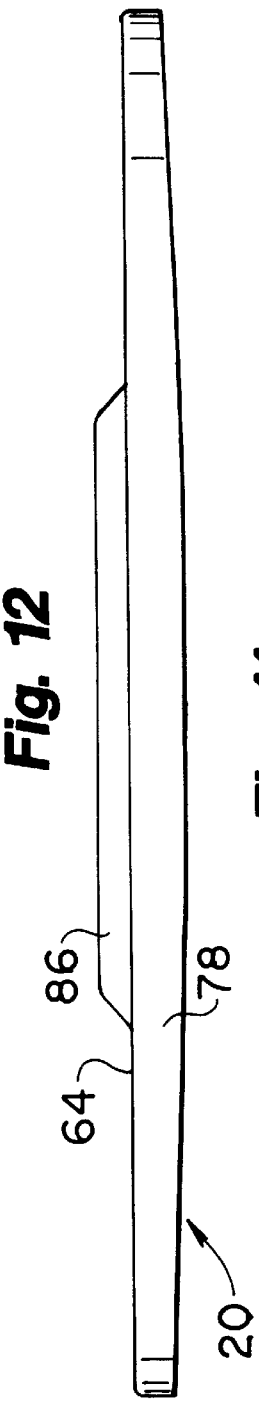
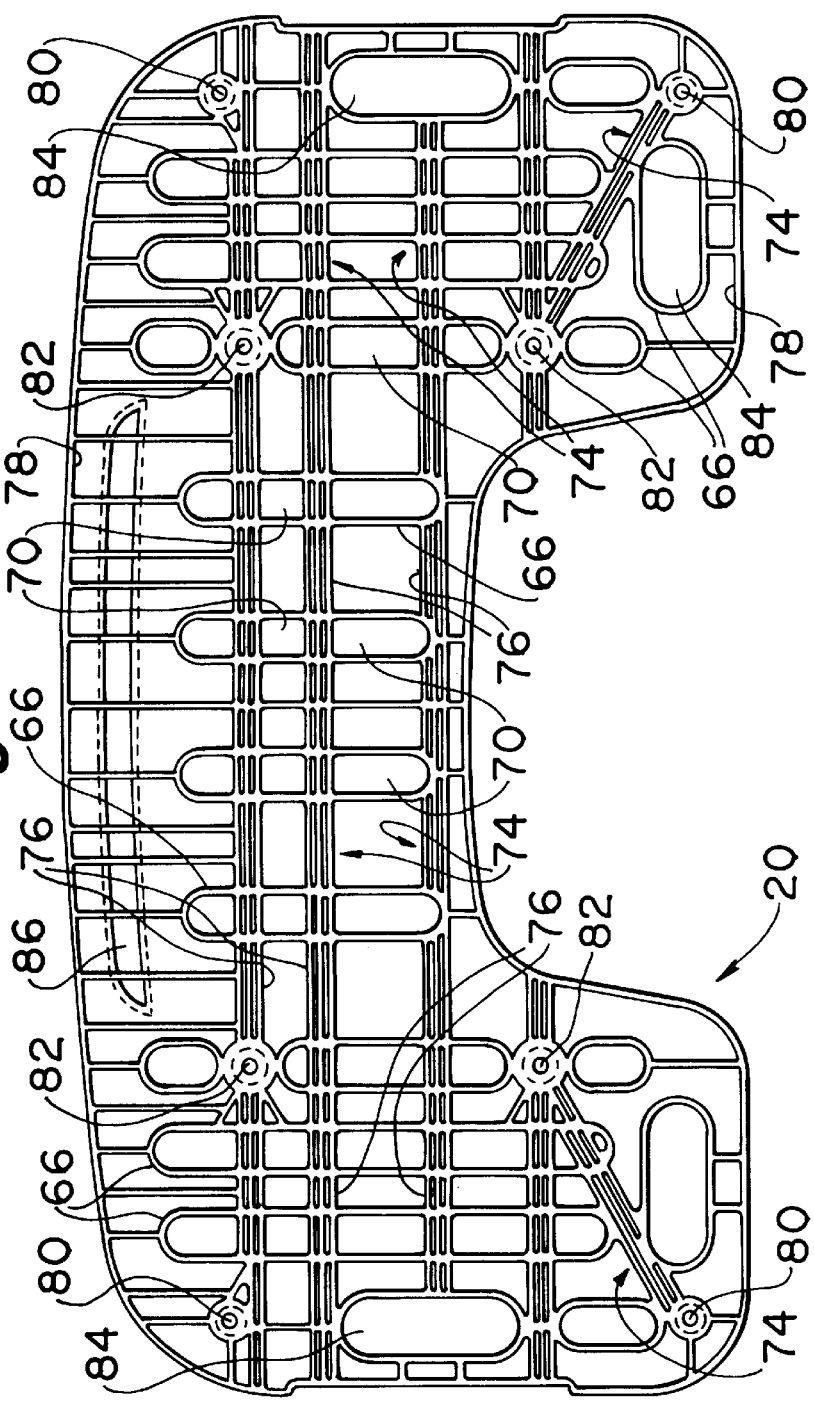

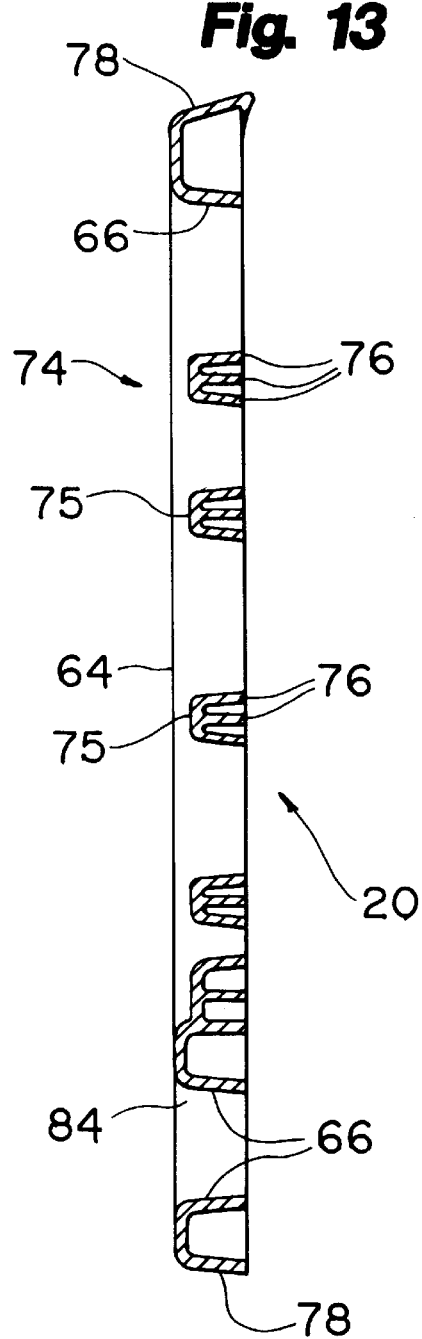
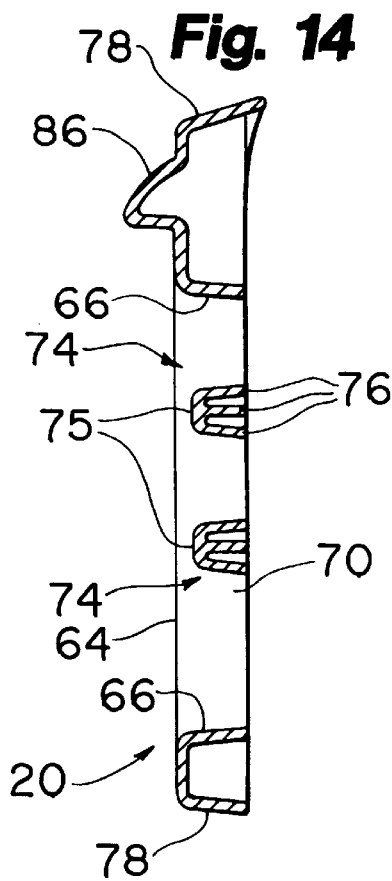
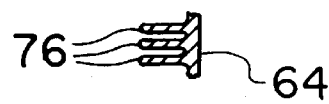
Fig. 13
Fig. 14
Fig. 15

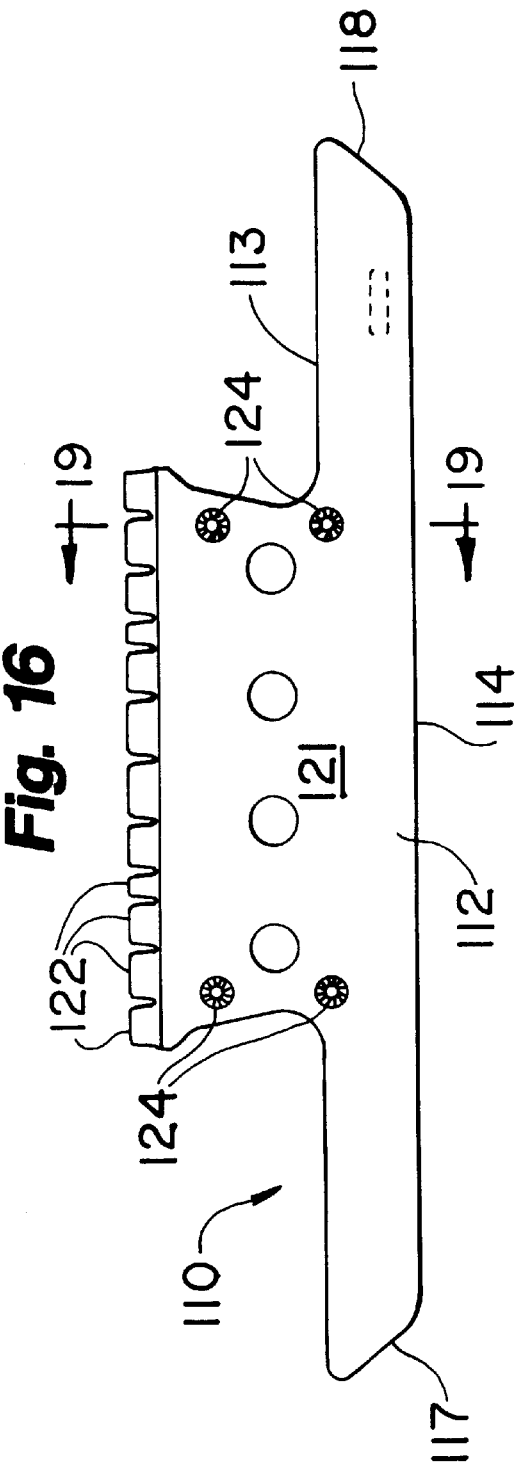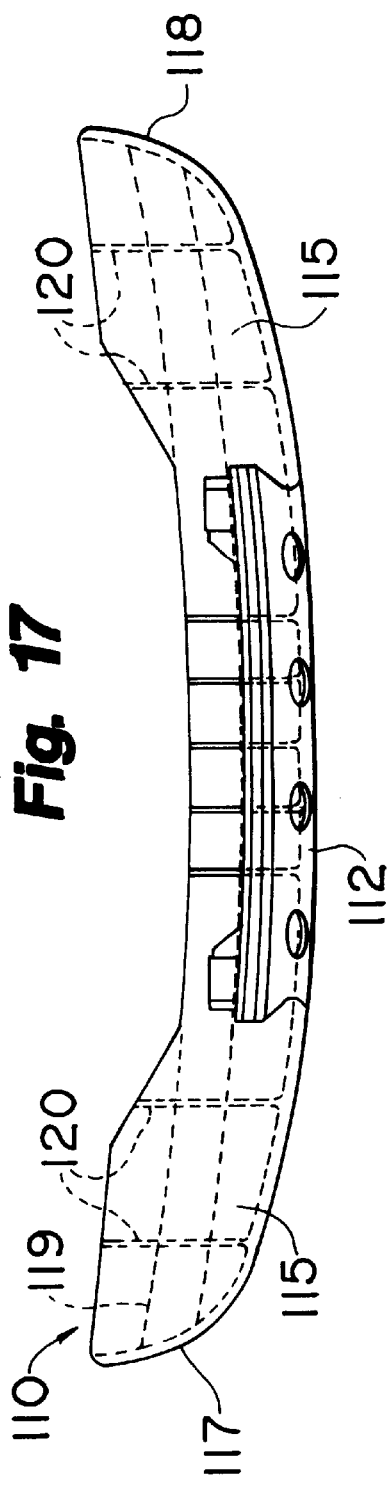

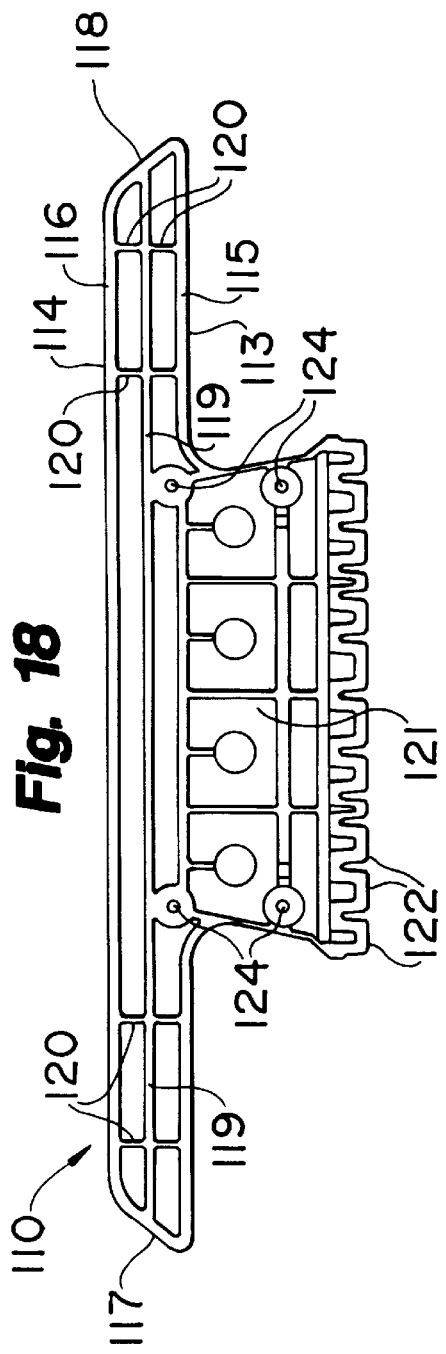
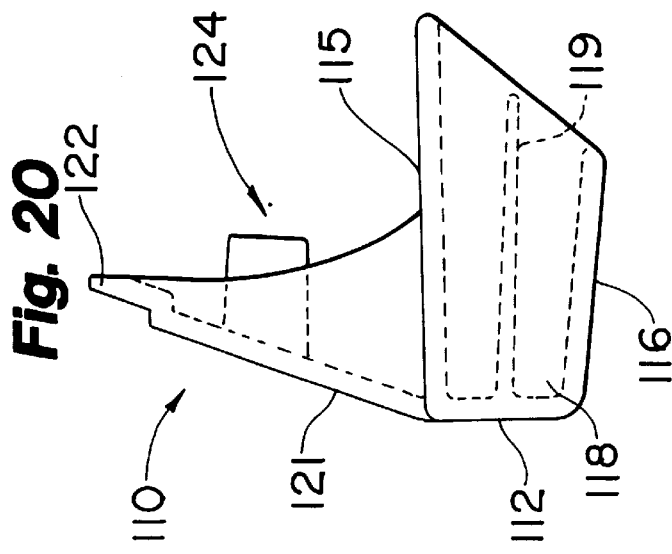
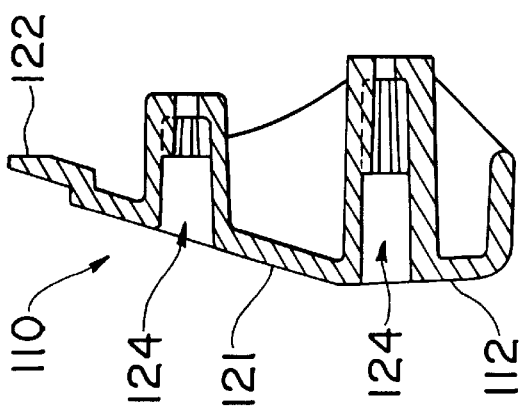

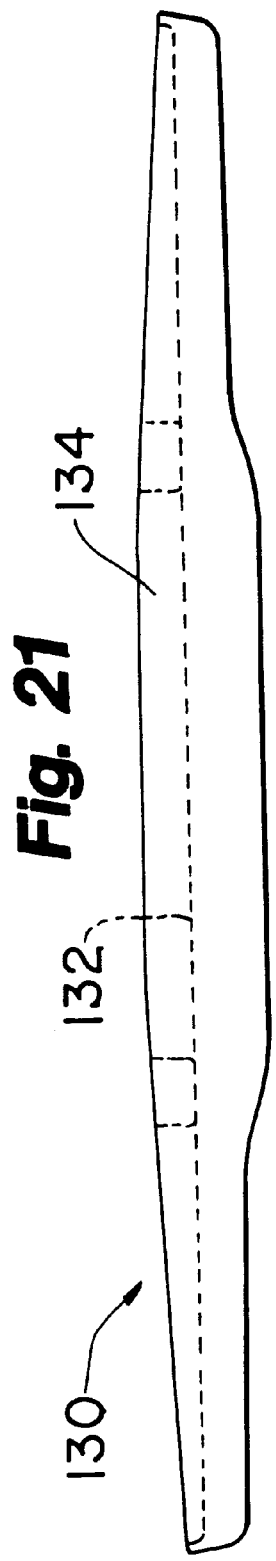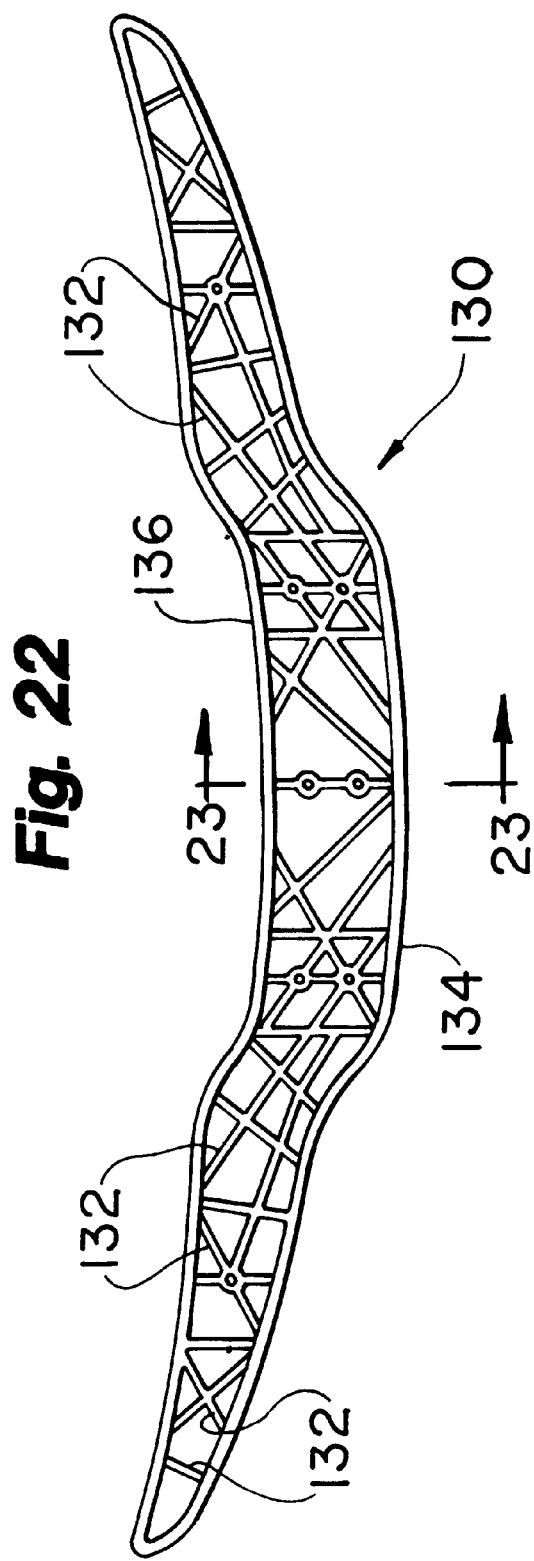

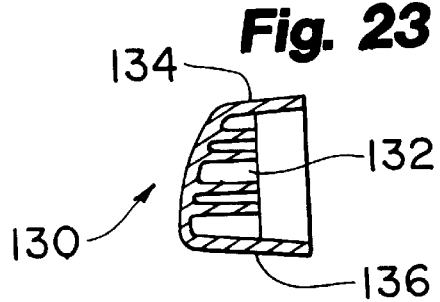
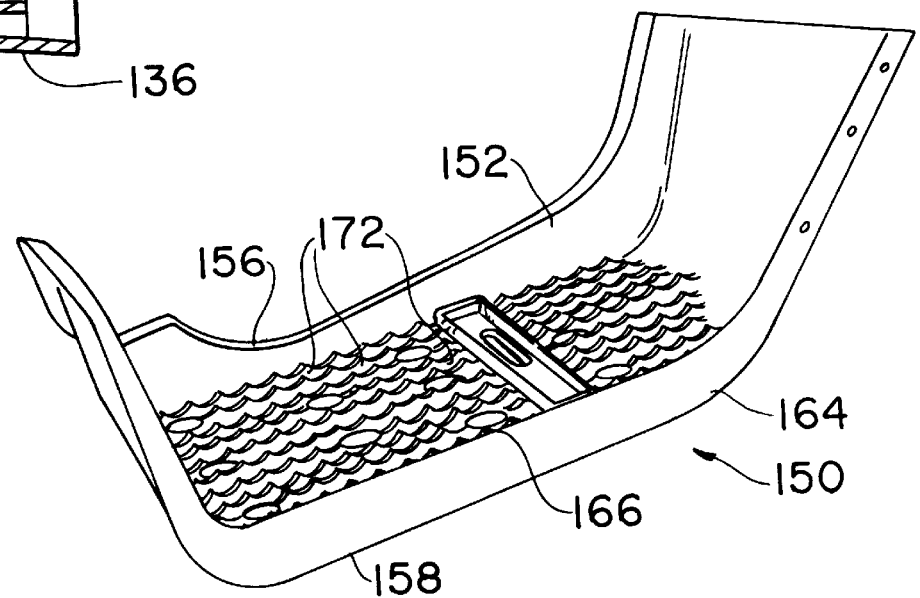
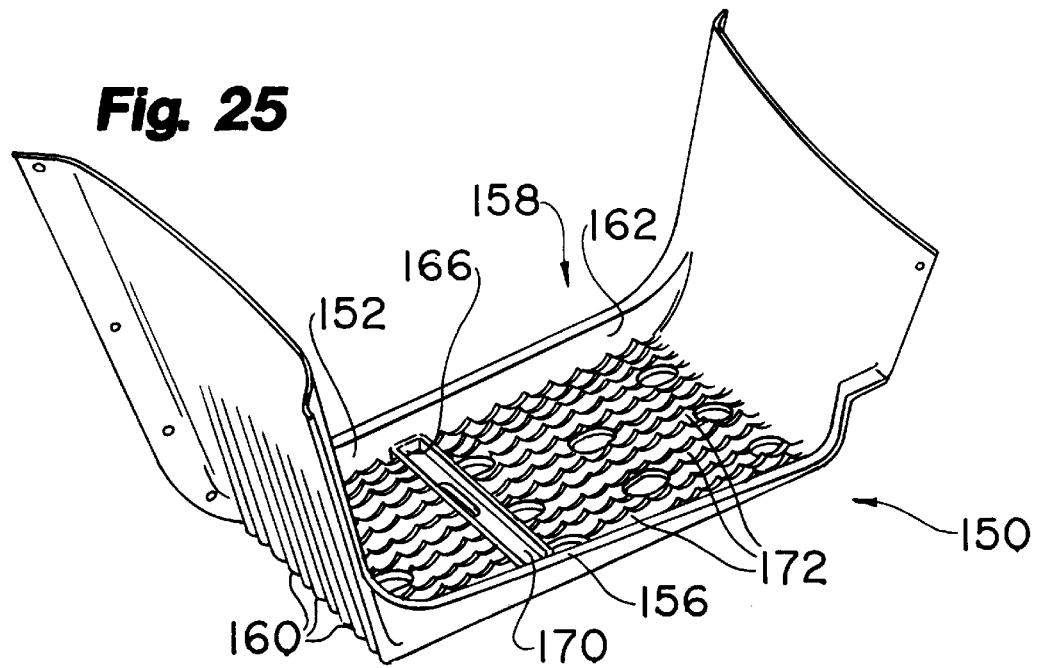

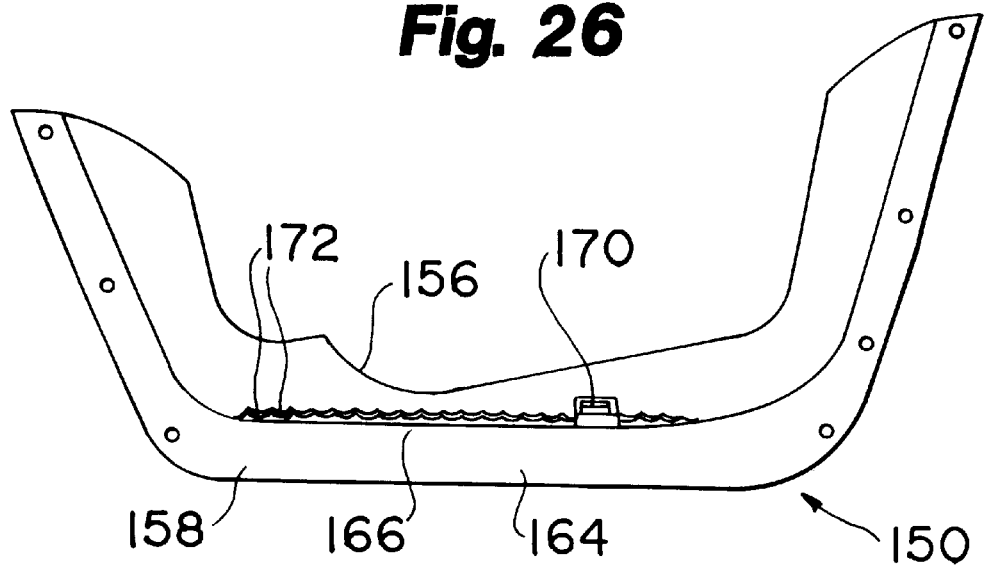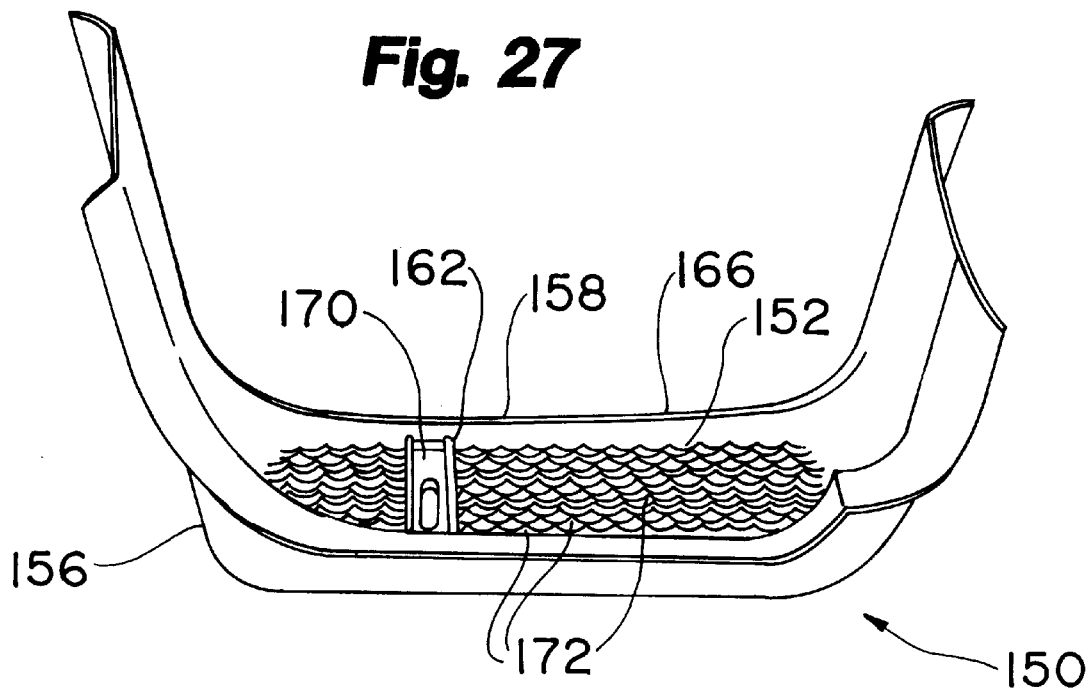

INJECTION MOLDED COMPONENTS FOR OFF-ROAD RECREATIONAL AND UTILITY VEHICLES

This application is a division of application Ser. No. 08/566,844, filed Dec. 4, 1995, now issued as U.S. Pat. No. 6,016,943 which is a continuation of application Ser. No. 08/536,754, filed Sept. 29, 1995, now abandoned entitled INJECTION MOLDED RACKS AND COMPONENTS FOR OFF-ROAD RECREATIONAL AND UTILITY VEHICLES.

TECHNICAL FIELD

The invention relates to injection molded racks and other components for off-road recreational and utility vehicles, such as all terrain vehicles, snowmobiles and the like.

BACKGROUND OF THE INVENTION

Off-road recreational and utility vehicles such as all terrain vehicles ("ATV's"), snowmobiles and the like frequently incorporate carrying racks, bumpers and similar components that traditionally have been fabricated from tubular steel (either square or round tube stock, though typically round), sometimes supplemented with stamped sheet metal where flat surfaces are desired. Although such steel construction usually provides the structural strength required for relatively rugged service, it is costly and labor intensive to fabricate—a typical rack for an ATV (often with associated bumper) may contain up to a dozen or more individual pieces, each of which must be cut to the proper length, some of which must be bent to the proper shape, and all of which must be welded together in the desired configuration. Because the assembly is manual, quality control is an important function to assure consistent assembly of the racks, bumpers, and similar components. Once assembled, the components must be painted before final assembly to the vehicle. Even with high quality painting technology, such components nevertheless are subject, eventually, to corrosion since the heavy service often required of the racks often eventually results in denting, chipping or scratching of the paint, giving corrosion an opportunity to set in. Moreover, design options are significantly limited by the nature of the material from which the components are made—any unique aesthetic nuances or style character built into a rack or bumper typically adds significant additional manufacturing pieces which must be fabricated and assembled, exacerbating the problems identified above.

While many components of vehicles have been made in recent years from non-metal materials, the role of such materials in general has been limited to non-structural components because they typically do not provide the necessary strength and durability. Alternately, certain relatively exotic non-metal structural materials have recently become available. They typically involve other severe drawbacks, such as very high cost, difficult handling characteristics, limitations on the use or application of color to the material, and the like. Accordingly, such materials have not been considered economical or desirable for use in the manufacture of racks, bumpers and similar structural components of recreational and utility vehicles such as ATV'S.

SUMMARY OF THE INVENTION

The invention provides injection molded structural components for use on off-road recreational and utility vehicles (such as ATV's, snowmobiles, and the like). In contrast to metal fabricated components, a component of the invention is easily injection molded in a single manufacturing step, which provides inherent quality control for size and configuration, and allows color to be selectively integrally molded into the component. Thus, the component provides substantial savings in manufacturing steps and labor, is economical to manufacture, and is not subject to corrosion. It does not dent or chip, and scratches, to the extent they can occur, do not affect the color of the component since the component may be molded of a solid color material. With properly designed structural configurations, the components provide ample structural strength, and the addition of unique aesthetic nuances, style character or function can be easily accommodated in many circumstances—since such nuances can be built right into the molding tooling, additional costs attributable to such additional aesthetic features are insignificant with reasonable volumes of production (and add no additional manufacturing steps). Thus, designers may be permitted relatively broad freedom for the creation of various "looks", both in terms of color and shape.

In one embodiment, the invention provides an injection molded rack for an off-road recreational and utility vehicle (such as an ATV, snowmobile or the like). The rack includes a fiber-filled plastic resin body having fibers of a length of at least about ¼ inch. The body has an overall thickness substantially less than its width and substantially less than its length, and includes a generally flat, horizontal top surface having a plurality of slots. Each of the slots is defined by a flange extending downwardly about the periphery of the slot, the flange having a thickness that is substantially less than its height to define a downwardly extending reinforcing rib.

Preferably the rack of the invention includes a plurality of integrally molded transverse reinforcing ribs extending across the slots, the reinforcing ribs having a top surface which is recessed below the generally flat, horizontal top surface of the rack. Desirably at least one of the transverse reinforcing ribs is comprised of two or more downwardly extending flanges spaced laterally from one another and being joined by a common upper web which defines the top surface of the transverse reinforcing rib. In a particularly preferred embodiment, at least one of the transverse reinforcing ribs is comprised of three or more of such downwardly extending flanges.

In another embodiment, the invention provides an injection molded foot rest for an off-road recreational or utility vehicle (such as an ATV, snowmobile or the like), comprising a fiber-filled plastic resin body having fibers of a length of at least about ¼ inch. The body includes top and bottom surfaces, inner and outer edges, and a nominal thickness of less than about ¼ inch. The bottom surface includes integrally molded downwardly extending reinforcing ribs. The outer edge has an upwardly extending ridge defining an outer boundary for the foot rest, the ridge including an inner upwardly extending flange and an outer downwardly extending skirt, the flange and skirt being joined by a common upper web which defines a top surface of the ridge, the flange and skirt thereby functioning to structurally reinforce the foot rest.

In a preferred embodiment, the foot rest further includes an integrally molded transverse cleat extending upwardly from the top surface of the foot rest body and extending substantially entirely across the foot rest body to form an integral heal cleat. The foot rest may also include molded gripping cleats extending upwardly from the top surface of the foot rest body. Preferably such gripping cleats comprise upwardly extending protrusions each of which terminate in a transversely oriented pointed edge.

In yet another embodiment, the invention provides an injection molded bumper for an off-road recreational or utility vehicle (such as an ATV, snowmobile or the like), comprising a fiber-filled plastic resin body having fibers of a length of at least about ¼ inch. The body has an overall thickness substantially less than its width and substantially less than its length, and includes a generally vertically oriented front surface having upper and lower peripheral edges. At least a portion of such upper peripheral edge and at least a portion of such lower peripheral edge each has a flange extending generally horizontally away from the front surface, such flanges having a thickness that is substantially less than the lengths they extend from the front surface to thereby define generally horizontally extending reinforcing ribs. Additional reinforcing ribs may also be provided intermediate the flanges.

BRIEF DESCRIPTION OF THE DRAWINGS

FIG. 2 is a top plan view of a rack of the invention;

FIG. 3 is a bottom plan view of the rack of FIG. 2;

FIG. 4 is a front elevational view of the rack of FIG. 2;

FIG. 5 is a side elevational view of the rack of FIG. 2;

FIG. 6 is a cross-sectional view of the rack of FIG. 2, taken along lines 6—6 thereof;

FIG. 7 is a cross-sectional view of the rack of FIG. 2, taken along lines 7—7 thereof;

FIG. 8 is a cross-sectional view of the rack of FIG. 2, taken along lines 8—8 thereof;

FIG. 9 is a cross-sectional view of the rack of FIG. 2, taken along lines 9—9 thereof;

FIG. 10 is a top plan view of an alternate rack of the invention;

FIG. 11 is a bottom plan view of the rack of FIG. 10;

FIG. 12 is a front elevational view of the rack of FIG. 10;

FIG. 13 is a cross-sectional view of the rack of FIG. 10, taken along lines 13—13 thereof;

FIG. 14 is a cross-sectional view of the rack of FIG. 10, taken along lines 14—14 thereof;

FIG. 15 is a cross-sectional view of the rack of FIG. 10, taken along lines 15—15 thereof;

FIG. 16 is a front elevational view of a bumper such as is depicted on the ATV of FIG. 1;

FIG. 17 is a top view of the bumper of FIG. 16;

FIG. 18 is a rear view of the bumper of FIG. 16;

FIG. 19 is a cross-sectional view of the bumper of FIG. 16, taken along lines 19—19 thereof;

FIG. 20 is a right side view of the bumper of FIG. 16;

FIG. 21 is a top view of an alternate embodiment of a bumper of the invention;

FIG. 22 is a rear view of the bumper of FIG. 21;

FIG. 23 is a cross sectional view of the bumper of FIG. 22, taken along lines 23—23 thereof;

FIG. 24 is a front, outside perspective view of a foot rest of the invention;

FIG. 25 is a rear, inside perspective view of the foot rest of FIG. 24;

FIG. 26 is an outside side view of the foot rest of FIG. 24;

FIG. 27 is an inside side view of the foot rest of FIG. 24;

DETAILED DESCRIPTION OF THE INVENTION

Figure 1:
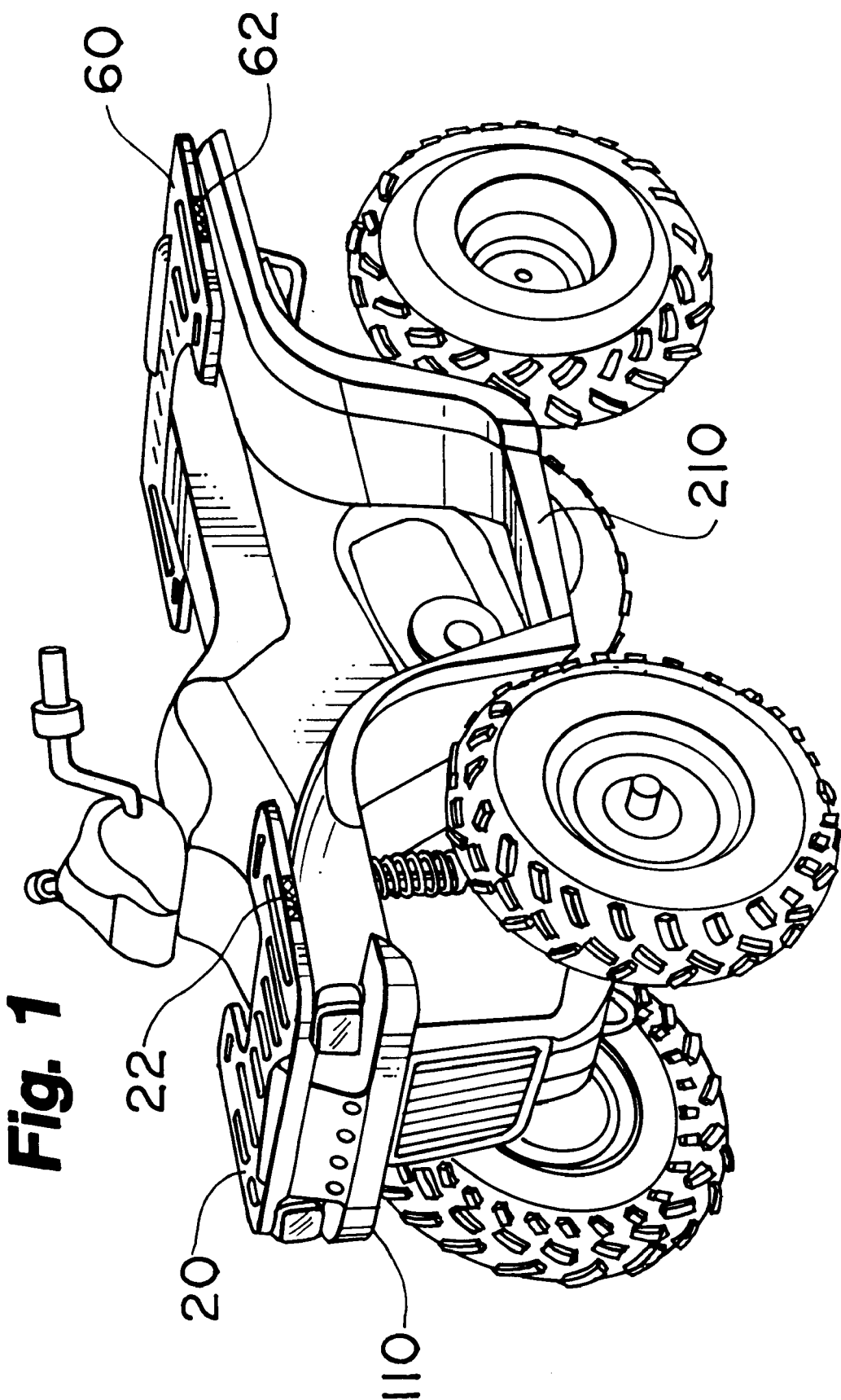
FIG. 1 depicts an ATV with the racks, bumper and foot rest of the invention mounted thereon.

FIG. 1 depicts an off-road recreational/utility vehicle commonly referred to as an all-terrain vehicle (ATV) on which is mounted the racks 20, 60, bumper 110 and foot rest 210 of the invention. It will be appreciated that other similar types of off-road recreational/utility vehicles could similarly utilize the components of the invention, such as snowmobiles, etc.

FIGS. 2–9 illustrate in detail the construction of one particular embodiment of an integrally molded rack 60 of the invention. The rack 60, which is injection molded, includes a generally flat, horizontal top surface 64 having a peripheral edge and a plurality of slots 70. Each of the slots is rimmed by a flange 66 which extends downwardly from the top surface 64, the flange therefore defining the periphery of the slot 70. The peripheral edge similarly includes a downwardly extending flange 78. The downwardly extending flanges 66 and 78 are integrally molded in the rack 60, and have a thickness that is substantially less than their height; the flanges 66 and 78 thus serve to structurally reinforce the rack against deflection, particularly against deflection about an axis generally perpendicular to the longitudinal dimension of the flanges. Desirably the flanges have a thickness of not more than about ⅓ their height, and preferably not more than about ⅙ their height. Desirably the flanges have a height of at least about ½ inch, and preferably least about ¾. The rack depicted in the drawings has a flange height of about one inch and flange thickness of about ⅙ inch, which has been found to work quite well. An incidental benefit of flanges with such heights and thicknesses is that the flanges provide ample convenient locations for attachment of bungee cords and similar fasteners.

The rack 60 also desirably is provided with a number of integrally molded reinforcing ribs 74 which extend across the slots 70, thereby providing additional reinforcement against deflection of the rack 60 in a direction generally parallel to (and, if necessary, at acute angles to) the longitudinal dimension of the slots 70. Desirably the ribs are made from material with a thickness similar to the thickness of the flanges—the rack depicted in the drawings has a rib thickness of about ⅛ inch.

As can be seen by reference to FIGS. 2, 4, 6 and 9, typically the transverse reinforcing ribs 74 are comprised of two or more (in many cases, three) downwardly extending flanges 76 which are spaced laterally from one another, being joined by a common upper web which defines the top surface 75 of the transverse reinforcing rib 74. Preferably this top surface 75 of the transverse reinforcing rib 74 is recessed with respect to the top surface 64 of the rack 60. Although recessing the transverse reinforcing ribs 74 does not entirely hide them from view (since they can nevertheless be seen through the slots 70), recessing them slightly does make them somewhat less visible, particularly at lower viewing angles. In a rack having overall dimensions of about 20 by 40 inches with slots about an inch wide and slot flanges about an inch tall, desirably the tops of the reinforcing ribs 74 are recessed at least about ⅛ inch, and preferably about ¼ inch from the top surface 64 of the rack. In the rack depicted in the drawings, the tops of the reinforcing ribs 74 are recessed about ¼ inch.

The availability of recessed reinforcing ribs provides a rack designer with a relatively large degree of latitude in designing the aesthetic and functional characteristics of the rack. While the flanges 66 rimming the slots 70 provide a significant degree of structural reinforcement to the rack 60, the designer is not necessarily constrained to any particular number, size, configuration or orientation of the slots, since (at least within broad limits), any necessary structural reinforcement not provided by the slot flanges 66 can be supplied by employing recessed reinforcing ribs 74. Thus, a rack designer is able to design the rack slots 70 with aesthetics, and/or functionality, primarily in mind, thereby creating the desired look and utility for the rack. Structural rigidity can then be supplied by building in the necessary reinforcing ribs 74. As noted above, while recessing the portion of these ribs 74 which are exposed by the slots 70 does not completely remove them from view, it does significantly subdue their prominence in relation to the slots 70 and any other topographical features on the top surface 64 of the rack, particularly at lower viewing angles.

The rack may be provided with a plurality of accessory mounting holes 80—in the embodiment depicted in FIG. 2, six such accessory mounting holes are provide about the outer periphery of the rack 60, for mounting, e.g., an accessory box or railing. Detail regarding the configuration of these holes is illustrated in FIG. 8. Frame mounting holes 82 may also be provided for mounting the rack to the vehicle. Details of two of these holes are shown in FIG. 7. In the rack 60 depicted in FIG. 2, four frame mounting holes 82 are provided. Note that these holes are not located at the outer extremities (i.e., the outer corners) of the rack 60. As a result, a significant portion of the rack is cantilevered outwardly from such frame mounting holes. Accordingly, it is desirable to locate a number of recessed reinforcing ribs 74 such that they extend from an area adjacent to the frame mounting holes 82 to an area adjacent to the outer extremities of the rack 60, in this case, that being the outer corners of the rack.

Conventional non-metallic materials generally are not strong enough to provide the strength and durability required for a rack of the used on ATV's and similar recreational/utility vehicles; moreover, many systems using fiber-reinforcement do not produce a sufficiently pleasing cosmetically clean finish—often fibers or fiber ends are visible at the surface, a result not ordinarily acceptable for finish parts used on ATV's and similar vehicles. It has been found, however, that utilizing injection moldable fiber-filled plastic resins having fibers of a length of at least about ¼ inch provides sufficient reinforcement to achieve the necessary strength characteristics, while still being injection moldable. Suitable fiber-filled resins having such desirable characteristics and also producing the desired finish characteristics are available commercially from Polymer Composites, Inc. of Winona, Minn., under the trademark CELLSTRAN®. A particularly preferred CELLSTRAN® glass filled polypropylene resin is sold under the designation PPG 40-02-4 (this particular resin has 40% glass fibers, and is supplied in pellet form, preferably in pellets 11 mm in length, therefore containing glass fibers of the same length). The Polymer Composites material is desirable because the glass fibers are believed to be entirely wetted by the resin; the material thus works well in injection molding equipment, and produces a finish substantially without any fibers showing at the surface.

As can be seen by reference to the drawings, preferred embodiments of the invention utilize injection molded material of a generally uniform thickness. That is, preferably the predominant portions of the top surface of the rack, as well as the predominant portions of the flanges and reinforcing ribs are all of a similar thickness—desirably in the range of about $\frac{1}{10}$ to about $\frac{1}{3}$ inch, and preferably about $\frac{1}{6}$ inch. Preferably the ratio of the thickest of such portions to the thinnest of such portions is no more than about 2:1.

Using conventional non-metallic materials, one ordinarily would not conclude that a rack of sufficient strength and durability could be successfully molded with such thinness. Molding the above-mentioned fiber-filled resins into the configuration shown in the drawings (i.e., with the reinforcing flanges and ribs), however, produces a remarkably strong, durable rack with excellent finish characteristics. Moreover, selected colors can be integrally molded into the part, so that painting is not necessary, thereby reducing manufacturing steps, complexity and cost; any scratches or other incidental damage to the component also are less noticeable since the part is of uniform color throughout its thickness. Since the part is not metallic, it is not subject to corrosion.

An upwardly protruding lip 86 may be provided along a portion of the periphery of the rack to assist in retaining gear on the rack. Recesses 61 may also be provided along the side edges for flush mounting of reflectors 62 (the reflectors are depicted in FIG. 1).

FIGS. 10–15 depict in detail the rack 20 mounted to the front of the ATV shown in FIG. 1. The front rack 20 for this particular vehicle is somewhat smaller than the rear rack 60, with the result that fewer reinforcing ribs are needed to obtain the structural strength required. Most of the other structural features of this embodiment of the invention are otherwise the same as the rack depicted in FIG. 2.

FIGS. 16–20 depict a bumper 110 of the invention manufactured using the process and materials described above with respect to the rack of the invention. The bumper includes a front face 112 having upper and lower peripheral edges 113 and 114, each of the edges in turn having a flange 115, 116, respectively, extending generally horizontally rearwardly away from the front surface 112. The left and right ends or sides of the bumper 110 similarly have rearwardly extending flanges which are joined with the upper and lower flanges 115 and 116. Together the flanges define generally rearwardly extending reinforcing ribs. One or more additional generally horizontal reinforcing ribs 119 may also be provided, along with vertical reinforcing ribs 120.

The particular bumper 110 depicted in FIGS. 16–20 includes an optional upwardly extending central member 121 which, as depicted in FIG. 1, is designed to mate with the front rack 20 described above. For this purpose, the central section includes a series of tabs 122 which are received in complementary recesses in the bottom front portion of the front rack 20. Additional rearwardly extending ribs may be provided in this upwardly extending central section to further reinforce the entire structure. A plurality of mounting holes 124 may be provided for mounting the bumper to the vehicle. FIGS. 19–20 illustrate additional rearwardly extending reinforcing cylinders formed about the mounting holes 124 for adding further structural strength to this portion of the bumper.

Note that the outer left and right ends 117 and 118 extend a significant distance outwardly of the mounting holes 124—i.e., the outer ends are significantly cantilevered in relation to the overall width of the bumper. Conventional non-metallic materials generally were not considered to be strong enough to provide the strength and durability required for a bumper of the type used on ATV's and similar recreational/utility vehicles, particularly given the cantilevered design depicted in the drawings. It has been found, however, that utilizing injection moldable fiber-filled plastic resins as noted above provides sufficient reinforcement and durability to achieve the necessary strength characteristics, while still being injection moldable. As noted above, suitable fiber-filled resins having such desirable characteristics and also producing the desired finish characteristics are available commercially from Polymer Composites, Inc. of Winona, Minn., under the trademark CELLSTRAN®. A particularly preferred CELLSTRAN® glass filled polypropylene resin is sold under the designation PPG 40-02-4 (this particular resin has 40% glass fibers, and is supplied in pellet form, preferably in pellets 11 mm in length, therefore containing glass fibers of the same length).

As can be seen by reference to the drawings, preferred embodiments of the invention utilize injection molded material of a generally uniform thickness. That is, preferably the predominant portions of the bumper, including the flanges and reinforcing ribs, are all of a similar thickness—desirably in the range of about 1/8 to about 3/4 inch, and preferably about 1/6 to about 1/2 inch. Preferably the ratio of the thickest of such portions to the thinnest of such portions is no more than about 2:1.

Using conventional non-metallic materials, one ordinarily would not conclude that a bumper of sufficient strength and durability could be successfully molded with such thinness. Molding the above-mentioned fiber-filled resins into the configuration shown in the drawings (i.e., with the reinforcing flanges and ribs), however, produces a remarkably strong, durable bumper with excellent finish characteristics. Moreover, selected colors can be integrally molded into the part, so that painting is not necessary, thereby reducing manufacturing steps, complexity and cost; any scratches or other incidental damage to the component also are less noticeable since the part is of uniform color throughout its thickness. Since the part is not metallic, it is not subject to corrosion.

FIGS. 21–23 illustrate an alternate embodiment of a bumper of the invention. This bumper 130 has a shape slightly different from the bumper 110 of FIGS. 16–20, in that it does not utilize the upwardly extending central member 121, and in that the internal rearwardly extending reinforcing ribs 132 are oriented at a variety of obtuse and acute angles to the upper peripheral edge and lower peripheral edge flanges of the bumper 130. Because of the number and orientation of the various internal ribs 132, these internal ribs 132 do not need to extend as far rearwardly as the upper and lower flanges 134 and 136.

FIGS. 24–30 depict a foot rest 150 of the invention which is injection molded for use on off-road recreational or utility vehicles such as the ATV depicted in FIG. 1. Like the racks and bumpers described above, the foot rest or foot well 150 is injection molded from a fiber-filled plastic resin to give it the strength, durability and resilience desired for such an application.

The foot rest includes an inner edge 156, and an outer ridge 158 defining an outer boundary for the foot rest. The outer ridge 158 is desirably comprised of an inner, upwardly extending flange 162 and an outer downwardly extending skirt 164, the flange 162 and skirt 164 being joined by a common upper web 166 which defines a top surface of the ridge, the flange and skirt thereby functioning to structurally reinforce the foot rest. Preferably the foot rest also includes an integrally molded transverse cleat 170 extending upwardly from the top surface of the foot rest body 152. Preferably the cleat 170 extends substantially entirely across the foot rest body to form an integral heal cleat against which the vehicle operator may grip with the heal of his shoe or boot.

Figure 31:
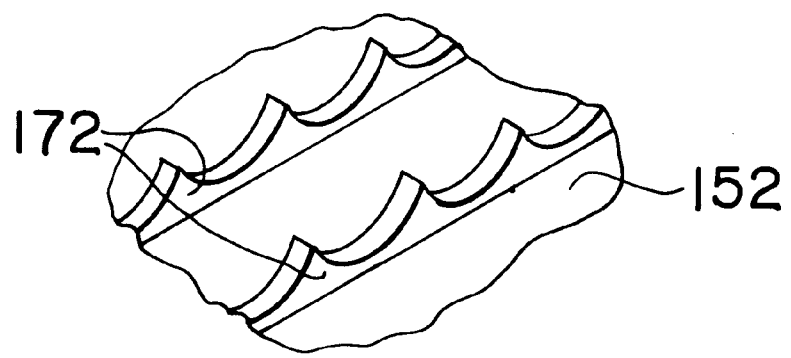
FIG. 31 is a broken away detail of the gripping cleats of the foot rest of FIG. 24.

Preferably the upper surface of the foot rest body 152 also includes integrally molded gripping cleats 172 dispersed over a substantial portion of the generally flat upper surface of the foot rest. In the particularly preferred embodiment shown in the drawings, the gripping cleats 172 comprise upwardly extending protrusions, each of which terminate in a transversely oriented pointed edge (shown in detail in FIG. 31). Also, preferably these gripping cleats 172 are arranged in a plurality of generally parallel longitudinal rows of ribs, the ribs being scalloped with the scallops terminating in transversely oriented pointed edges. These pointed edges make an excellent gripping surface for the rider's shoes or boots.

Figure 28:
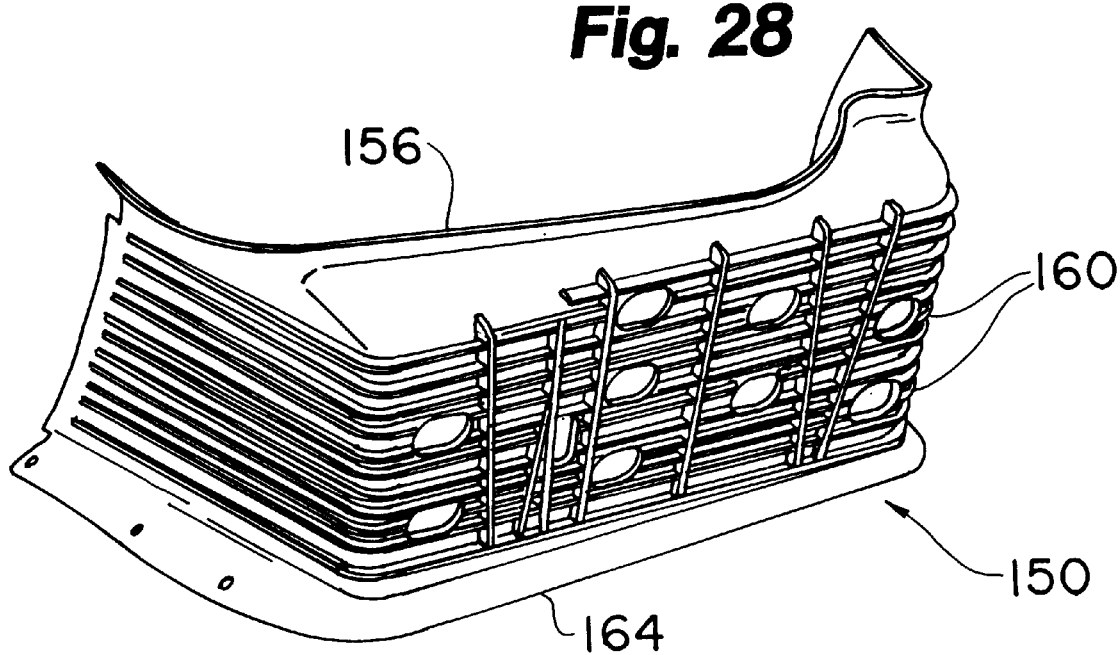
FIG. 28 is a bottom, rear, inside perspective view of the foot rest of FIG. 24.
Figure 29:
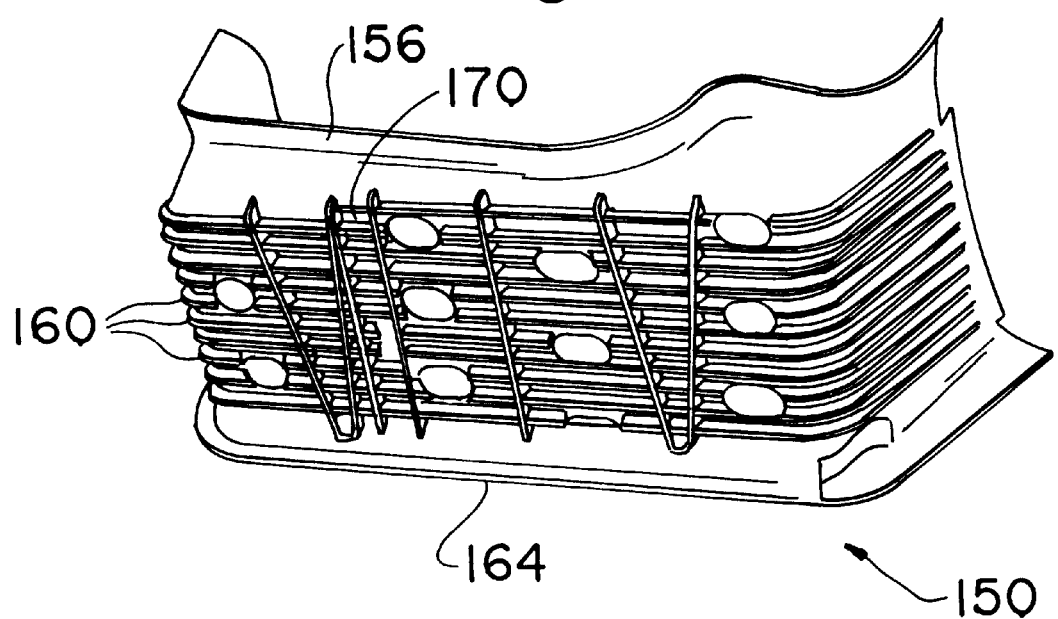
FIG. 29 is a bottom, front, inside perspective view of the foot rest of FIG. 24.
Figure 30:
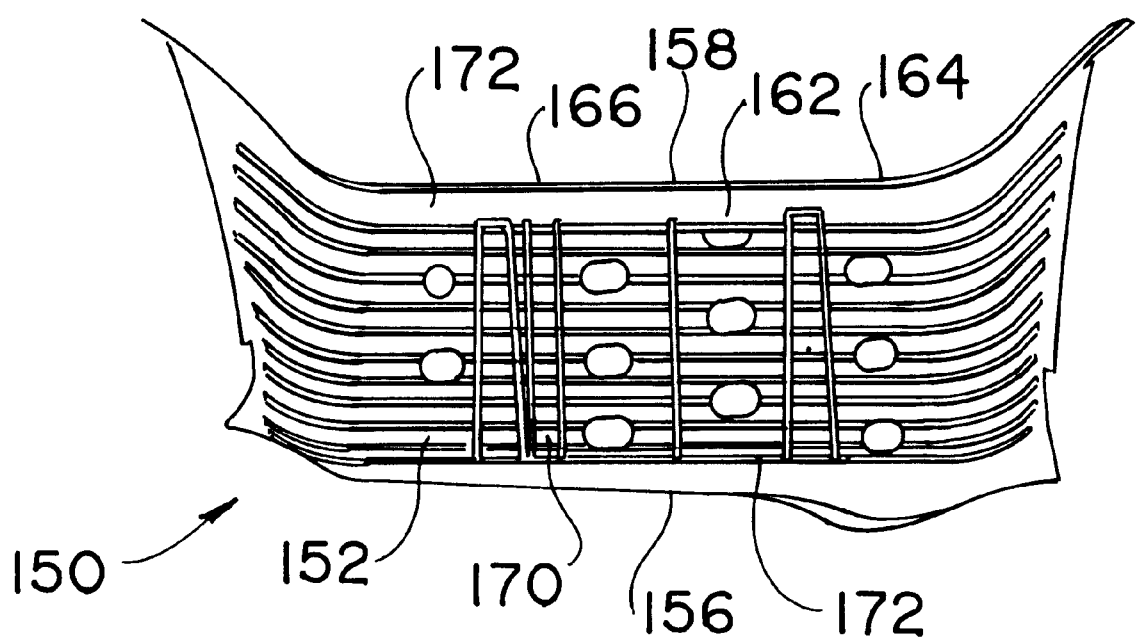
FIG. 30 is a top view of the foot rest of FIG. 24.

As is shown in particular detail in FIGS. 28–30, desirably the foot rest 150 also includes reinforcing ribs 160 integrally molded to extend downwardly from the bottom of the foot rest. The size and depth of these ribs can be selected based on the desired rigidity requirements of the particular application.

Suitable fiber-filled resins having desirable characteristics for this component and also producing the desired finish characteristics are available commercially from Polymer Composites, Inc. of Winona, Minn. A particularly preferred glass filled nylon resin is sold under the designation N6G50-01-4. This resin includes about 50% glass fiber. The polypropylene resin material used for the bumpers and racks, sold under the designation PPG 40-02-4, is also suitable, although it has been found that reduction of the percentage of glass fibers from 40% to 20% (by adding in compatible polypropylene) yields a less rigid foot rest which is less likely to fracture, e.g., if the foot rest strikes a rock, stump, etc. Both of these materials are supplied in pellet form, preferably in pellets 11 mm in length, therefore containing glass fibers of the same length.

As can be seen by reference to the drawings, preferred embodiments of the invention utilize injection molded material of a generally uniform thickness. That is, preferably the predominant portions of the foot rest, including the predominant portions of the flanges and reinforcing ribs are all of a similar thickness—desirably in the range of about 1/10 to about 1/3 inch, and preferably about 1/6 inch. Preferably the ratio of the thickest of such portions to the thinnest of such portions is no more than about 2:1.

While a preferred embodiment of the present invention has been described, it should be understood that various changes, adaptations and modifications may be made therein without departing from the spirit of the invention and the scope of the appended claims.

What is claimed is:

1. An all terrain vehicle comprising:
   a chassis carrying a straddle-type seat which is sufficiently narrow to be straddled by a rider;
   a pair of front wheels mounted to the chassis, and handlebars connected to the front wheels for steering the vehicle;
   a pair of rear wheels mounted to the chassis;
   a laterally extending footrest on each side of the chassis;
   an engine carried by the chassis, the engine being connected to a drive train supplying motive power to at least some of the wheels; and
   an injection molded bumper including:

a fiber-filled plastic resin body, the body including a generally vertically oriented front surface, the front surface having upper and lower peripheral edges, at least a portion of such upper peripheral edge and at least a portion of such lower peripheral edge each having a flange extending generally horizontally away from the front surface, such flanges having thicknesses substantially less than the lengths they extend from the front surface to thereby define generally horizontally extending reinforcing ribs, the front surface also including side peripheral edges each having a flange extending generally away from the front surface and connecting the upper and lower peripheral edge flanges.

2. The all terrain vehicle of claim 1 wherein the injection molded bumper includes a plurality of integrally molded additional reinforcing ribs extending from the upper edge flange to the lower edge flange.

3. An all terrain vehicle comprising:

a chassis carrying a straddle-type seat which is sufficiently narrow to be straddled by a rider;

a pair of front wheels mounted to the chassis, and handlebars connected to the front wheels for steering the vehicle;

a pair of rear wheels mounted to the chassis;

a laterally extending footrest on each side of the chassis;

an engine carried by the chassis, the engine being connected to a drive train supplying motive power to at least some of the wheels; and an injection molded bumper including:

a fiber-filled plastic resin body, the body including a generally vertically oriented front surface, the front surface having upper and lower peripheral edges, at least a portion of such upper peripheral edge and at least a portion of such lower peripheral edge each having a flange extending generally horizontally away from the front surface, such flanges having thicknesses substantially less than the lengths they extend from the front surface to thereby define generally horizontally extending reinforcing ribs, the front surface also including side peripheral edges each having a flange extending generally away from the front surface and connecting the upper and lower peripheral edge flanges, one or more integrally molded additional reinforcing ribs extending from one of the side peripheral edges to the other side peripheral edge.

4. The all terrain vehicle of claim 1 wherein the flanges have thicknesses not more than about ⅓ the distance they extend away from the front surface of the bumper.

5. The all terrain vehicle of claim 1 wherein the flanges have thicknesses not more than about ⅙ the distance they extend away from the front surface of the bumper.

6. The all terrain vehicle of claim 1 wherein the flanges extend away from the front surface of the bumper a distance of at least about two inches.

7. The all terrain vehicle of claim 1 wherein the flanges extend away from the front surface of the bumper a distance not less than the vertical distance from one such flange to the other.

8. The all terrain vehicle of claim 1 wherein the flanges extend away from the front surface of the bumper a distance not less than one half the vertical distance from one such flange to the other.

9. The all terrain vehicle of claim 1 wherein a substantial portion of the flanges have thicknesses of not more than about ½ inch.

10. The all terrain vehicle of claim 1 wherein a substantial portion of the flanges have thicknesses of not more than about ⅜ inch.

11. The all terrain vehicle of claim 1 wherein the predominant portions of the body of the bumper and the flanges have generally similar thicknesses, the ratio of the thickest of such portions to the thinnest of such portions being no more than about 2:1.

12. The all terrain vehicle of claim 1 wherein the fiber-filled plastic resin body of the bumper has fibers of a length of at least about ¼ inch.

13. The all terrain vehicle of claim 1 wherein the body of the bumper has an overall thickness substantially less than its width and substantially less than its length.

14. An all terrain vehicle comprising:

a chassis carrying a straddle-type seat which is sufficiently narrow to be straddled by a rider;

a pair of front wheels mounted to the chassis, and handlebars connected to the front wheels for steering the vehicle;

a pair of rear wheels mounted to the chassis;

a laterally extending footrest on each side of the chassis;

an engine carried by the chassis, the engine being connected to a drive train supplying motive power to at least some of the wheels; and an injection molded bumper including:

a fiber-filled plastic resin body having an overall thickness substantially less than its width and substantially less than its length, the body including a generally vertically oriented front surface, the front surface having upper and lower peripheral edges, at least a portion of such upper peripheral edge and at least a portion of such lower peripheral edge each having a flange extending horizontally away from the front surface thereby defining horizontally extending reinforcing ribs, and one or more integrally molded additional reinforcing ribs extending from one of the side peripheral edges to the other side peripheral edge, the additional reinforcing ribs extending horizontally away from the front surface at least as far as the lower peripheral edge flange extends horizontally away from the front surface.

15. The all terrain vehicle of claim 14 wherein the flanges have thicknesses of not more than about ⅙ the distance they extend away from the front surface of the bumper.

16. The all terrain vehicle of claim 14 wherein the flanges extend away from the front surface of the bumper a distance not less than the vertical distance from one such flange to another.

17. An all terrain vehicle comprising:

a chassis carrying a straddle-type seat which is sufficiently narrow to be straddled by a rider;

a pair of front wheels mounted to the chassis, and handlebars connected to the front wheels for steering the vehicle;

a pair of rear wheels mounted to the chassis;

a laterally extending footrest on each side of the chassis;

an engine carried by the chassis, the engine being connected to a drive train supplying motive power to at least some of the wheels; and an injection molded bumper including:

a fiber-filled plastic resin body having an overall thickness substantially less than its width and substantially less than its length, the body including a generally vertically oriented front surface, the front surface having upper and lower peripheral edges, at least a portion of such upper peripheral edge and at least a portion of such lower peripheral edge each having a flange extending generally horizontally away from the front surface, such flanges having thicknesses substantially less than the lengths they extend from the front surface to thereby define generally horizontally extending reinforcing ribs, the front surface having a plurality of mounting holes formed therethrough for mounting the bumper to the vehicle, the body having an outer left portion and an outer right portion, the outer left and outer right portions extending a significant width outwardly of the mounting holes in relation to the overall width such that the outer left and outer right portions are significantly cantilevered in relation to the overall width of the bumper.

18. The all terrain vehicle of claim 17 wherein the injection molded bumper further includes rearwardly extending reinforcing cylinders formed about the mounting holes.

19. The all terrain vehicle of claim 17 wherein the flanges have thicknesses of not more than about ⅙ the distance they extend away from the front surface of the bumper.

20. The all terrain vehicle of claim 17 wherein the flanges extend away from the front surface of the bumper a distance not less than the vertical distance from one such flange to the other.

21. An all terrain vehicle comprising:

a chassis carrying a straddle-type seat which is sufficiently narrow to be straddled by a rider;

a pair of front wheels mounted to the chassis, and handlebars connected to the front wheels for steering the vehicle;

a pair of rear wheels mounted to the chassis;

a laterally extending footrest on each side of the chassis;

an engine carried by the chassis, the engine being connected to a drive train supplying motive power to at least some of the wheels; and an injection molded bumper including:

a fiber-filled plastic resin body having an overall thickness substantially less than its width and substantially less than its length, the body including a generally vertically oriented front surface, the front surface having upper and lower peripheral edges, at least a portion of such upper peripheral edge and at least a portion of such lower peripheral edge each having a flange extending generally horizontally away from the front surface, such flanges having thicknesses substantially less than the lengths they extend from the front surface to thereby define generally horizontally extending reinforcing ribs, and a central member extending upwardly from the body.

22. The all terrain vehicle of claim 21 wherein the central member has left and right side edges, the front face having a plurality of mounting holes formed therethrough the for mounting the bumper to the vehicle, the mounting holes being interior to the left and right side edges of the central member.

23. The all terrain vehicle of claim 22 wherein the injection molded bumper further includes rearwardly extending reinforcing cylinders formed about the mounting holes.

24. The all terrain vehicle of claim 21 wherein the upwardly extending central member is adapted to mate with a front rack.

25. The all terrain vehicle of claim 24 wherein the central member includes a series of tabs for mating with the front rack.

26. The all terrain vehicle of claim 21, wherein the injection molded bumper further includes additional rearwardly extending ribs to further reinforce the entire structure.

* * * * *